(12) United States Patent
Myneni et al.

(10) Patent No.: US 11,544,375 B2
(45) Date of Patent: Jan. 3, 2023

(54) CORRECTIVE ACTION ON MALWARE INTRUSION DETECTION USING FILE INTROSPECTION

(71) Applicant: VMware, Inc., Palo Alto, CA (US)

(72) Inventors: Sirisha Myneni, Santa Clara, CA (US); Nafisa Mandliwala, Santa Clara, CA (US); Subrahmanyam Manuguri, San Jose, CA (US); Anirban Sengupta, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 328 days.

(21) Appl. No.: 16/718,174

(22) Filed: Dec. 17, 2019

(65) Prior Publication Data

US 2021/0182388 A1    Jun. 17, 2021

(51) Int. Cl.
    *G06F 21/55*    (2013.01)
    *G06N 5/04*    (2006.01)
    *G06N 20/00*    (2019.01)

(52) U.S. Cl.
    CPC ............ *G06F 21/554* (2013.01); *G06N 5/04* (2013.01); *G06N 20/00* (2019.01)

(58) Field of Classification Search
    CPC ......... G06F 21/554; G06N 5/04; G06N 20/00
    See application file for complete search history.

(56) References Cited

U.S. PATENT DOCUMENTS

| | | | |
|---|---|---|---|
| 7,991,726 B2 | 8/2011 | Zhou et al. | |
| 8,224,761 B1 * | 7/2012 | Rockwood | H04L 63/0263 709/224 |
| 9,654,510 B1 | 5/2017 | Pillai et al. | |
| 9,680,877 B2 | 6/2017 | Duffield et al. | |
| 11,182,163 B1 * | 11/2021 | Beals | G06F 9/3017 |
| 2009/0144216 A1 | 6/2009 | Zhou et al. | |
| 2011/0004935 A1 | 1/2011 | Moffie et al. | |
| 2012/0222070 A1 * | 8/2012 | de los Reyes | H04N 21/488 725/110 |

(Continued)

OTHER PUBLICATIONS

Unknown, "What is an Intrusion Prevention System?", PaloAlto Networks, Cyberpedia, 2019, 5 pages, https://www.paloaltonetworks.com/cyberpedia/what-is-an-intrusion-prevention-system-ips.

(Continued)

*Primary Examiner* — Matthew T Henning

(57) ABSTRACT

File events are correlated with intrusion detection alerts for corrective action. A monitoring component receives file events from a thin agent. An analysis component analyzes the file events and metadata obtained from the intrusion detection alerts, such as attack type or file name, to correlate a set of file events to at least one detected action (intrusion) described in the alert. A recommendation component identifies one or more options, including one or more corrective actions, which are applicable for remediating the alert. The set of options includes a recommended action from two or more possible corrective actions. The set of options are output or displayed to the user. The user selects which option/action to perform in response to the alert. In some examples, an automatic response is performed without user selection with respect to selected types of alerts, detected action(s), selected file(s) or other user-generated criteria.

20 Claims, 12 Drawing Sheets

(56) References Cited

U.S. PATENT DOCUMENTS

| | | | |
|---|---|---|---|
| 2016/0036846 A1* | 2/2016 | Oliphant | G06F 21/55 |
| | | | 726/23 |
| 2016/0162685 A1 | 6/2016 | Feroz et al. | |
| 2017/0223046 A1* | 8/2017 | Singh | H04L 51/12 |
| 2018/0196942 A1* | 7/2018 | Kashyap | G06F 21/561 |
| 2020/0175165 A1* | 6/2020 | Murphy | G06F 21/566 |
| 2020/0177615 A1* | 6/2020 | Grabois | H04L 63/1416 |
| 2020/0242611 A1 | 7/2020 | Raman et al. | |

OTHER PUBLICATIONS

Unknown, "What is an Intrusion Detection System?", PaloAlto Networks, Cyberpedia, 2019, 4 pages, www.paloaltonetworks.com/cyberpedia/what-is-an-intrusion-detection-system-ids.

Unknown, "Trustwave Managed Detection Essential; Security Monitoring From Trustwave Experts", Trustware, 2019, 2 pages, https://www.trustwave.com.

"Fine Tuning your Intrusion Detection System to Minimize False Positive Alerts", Jan. 31, 2017, 13 pages, https://blog.rapid7.com.

\* cited by examiner

CORRECTIVE ACTION ON MALWARE INTRUSION DETECTION USING FILE INTROSPECTION

BACKGROUND

Enterprise systems typically utilize a multitude of intrusion detection systems (IDS) to protect systems from intrusions, such as malware attacks. Typically, when a malware attack is detected by the IDS, an alert is sent to a user. On detection of an intrusion, the user (e.g., administrator) receiving the alert is expected to manually root out the cause of the intrusion and determine what action should be taken to address the alerts with no additional assistance beyond the limited amount of information provided in the alert. The IDS alert does not provide any solutions to remediate. Thus, resolving these incidents can be a difficult, inefficient, and labor-intensive process for human users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method for corrective action intrusion detection alerts based on correlated file events. File events and metadata from an intrusion detection alert are analyzed. A detected action identified in the malware alert is correlated with a set of file events associated with at least one file. Event-correlation data is generated based on the correlated events. The event-correlation data is mapped to a set of options suitable for responding to the alert. A response action is selected. The selected response action is performed to resolve the event or issue associated with the alert.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 12, the systems are illustrated as schematic drawings. The drawings may not be to scale.

DETAILED DESCRIPTION

Figure 1:
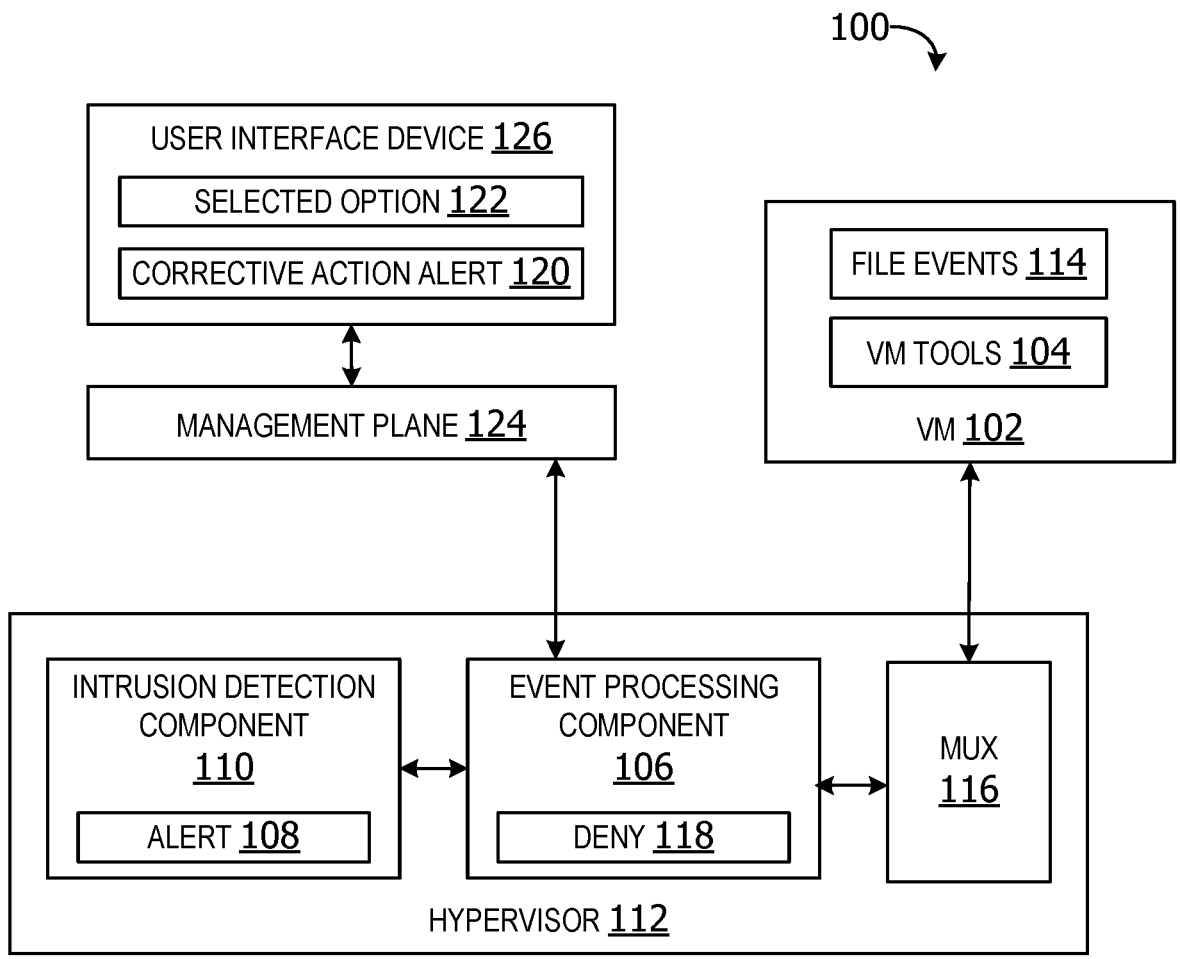
FIG. 1 is an exemplary block diagram illustrating a system configured for generating corrective action intrusion detection alerts according to an embodiment.

An intrusion is an attack or unauthorized access or other activity on a file or other system resource. Intrusions include various kinds of attacks, such as, but not limited to, malware attacks, domain name server (DNS) attacks, web application intrusions, or any other malicious activity on a network. An intrusion detection system (IDS) is a system or system component that works to prevent an intrusion before it happens or detect an intrusion that has already happed or that is in progress. Intrusion detection systems include hardware and/or software systems for detecting security breaches, malicious activity policy violations, threats or other attacks on a network or system components.

There are various intrusion prevention systems that block access at the network layer to prevent attacks, such as malware attacks. However, these solutions do not provide fine grained control over the file events in a virtual computing instance (VCI), such as, but not limited to, a guest virtual machine (VM).

Current intrusion detection systems cannot correlate malware signatures with actual hosts because this requires such systems to run an agent on the host. The network intrusion systems which match the packets with the signatures at the network level are required to redirect metadata (e.g., packet headers, etc.) to third party vendors for correlation. This can be time-consuming and resource intensive.

Aspects of the disclosure provide a computerized method and system for correlating file events with intrusion detection alerts and outputting options to a user associated with suitable response actions which can be taken to remediate the intrusion event. In some examples, an event processing component monitors file events upon detecting an alert. The event processing component uses the file events and the alert metadata to generate event correlated data which is output to the user to assist the user in selecting an appropriate action to take in response to the alert. This automates the process of rooting out the cause of intrusion alerts and identifying affected files/users. The event processing component saves user time investigating an alert and searching for relevant additional information which is not provided in malware alerts.

Other examples include a thin agent which monitors for file events associated with the file name provided in the alert. This reduces user time spent reviewing systems log data for additional information associated with the alert and improves user efficiency.

Still other aspects of the disclosure provide a machine learning component which analyzes real-time data using artificial intelligence and/or pattern recognition to identify a set of options, including at least one response action which the user can take to remediate the intrusion event associated with the alert. This improves intrusion alert handling and reduces human error during intrusion alert remediation.

The disclosure operates in an unconventional way by correlating real-time file events with malware alerts to identify recommended options/actions which the user can take to remediate an intrusion alert. The file event correlation enables fine-grained control over remediation while improving user-response time, ensuring appropriate action is taken and reducing user-time spent attempting to identify the intrusion event and determine appropriate action based on the limited information that is provided in the original malware alert.

Further, the event processing component includes machine learning which enables the system to generate more accurate/helpful correlated event data and sets of options over time based on user-generated feedback. As the system provides correlated event data to the user, the feedback indicates how helpful or relevant the data and/or options were to the user and/or identifies unincluded options which may have been relevant. In this manner, the machine learning component improves event correlation and identification of options for output to the user.

A recommendation component in other examples identifies a recommended option from a set of multiple possible actions. The recommended option/action identifies the option/action which appears to be best for remediation based on the type of attack, file, etc. This improves quality of remediation actions selected by the system and/or the user.

The event processing component in yet other examples automatically initiates a recommended option/action for remediation in response to an intrusion alert based on the correlation of the alert with file events. In these examples, the remediation action is selected and performed without a human user. This improves intrusion alert handling efficiency while reducing costs associated with detection, analysis and remediation of intrusion alerts.

Aspects of the disclosure reduce network bandwidth usage by automatically correlating monitored file events with a malware alert and generating event-correlation data based on the correlated set of file events and metadata from the malware alert. The event-correlation data provides the human user with the file name associated with a selected file subjected to the detected action, a user identifier of a user associated with the detected action (e.g., the user is either performing the action, or the action is being performed under the user's login), a type of attack associated with the malware alert, and/or other relevant data. The network bandwidth usage is reduced by minimizing or eliminating user time spent searching for this and other alert related data.

The automatic display of event-correlation data and a set of options for handling the alert results in reduced network traffic and improvements in human-machine interface where the user spends less time searching for relevant data to determine which options may be appropriate to respond to the alert.

The display/output of the set of options and/or output recommendation for dealing with the alert further reduces processing usage because all relevant information along with applicable options are efficiently determined and presented to the user with minimized/optimized resource utilization. This minimizes/reduces or eliminates the processor resources which would otherwise be used by the human user while searching for alert-related data manually and trying to identify possible responses to the alert without all of the relevant data at hand.

The human-machine interface is further improved because the event processing component may automatically initiate an appropriate response action on the selected file corresponding to a user-selected option from the set of options responsive to receiving a selection of an option from the set of options from a user via the user interface device. This reduces user time implementing a response, creating fewer clicks for the user to perform the response action.

FIG. 1 is an exemplary block diagram illustrating a system 100 configured for generating corrective action intrusion detection alerts according to an embodiment. The system in this example includes one or more VMs 102. A VM 102 is a virtualized computer system providing functionality of a physical computer within a host computing environment. Implementation of the VM includes specialized hardware and/or specialized software. While described with reference to VMs in various examples, the disclosure is operable with any form of virtual computing instance (VCI) including, but not limited to, VMs, containers, or other types of VCIs. Alternatively, or additionally, the system 100 is generally operable in non-virtualized implementations and/or environments without departing from the description herein.

In this example, VM tools is at least one driver that uses a filtering platform, such as, but not limited to, the Windows™ filtering platform (WFP) to interact with packet processing taking place at several layers in the networking stack of the operating system. A file system filter driver (FSFD) intercepts file events 114 and/or network events. The VM tools 104 sends the file events to the event processing component 106 in response to an occurrence of an alert 108 generated by an intrusion detection component 110.

The intrusion detection component 110 is an intrusion detection system running on the hypervisor/host for detecting intrusions, such as, but not limited to, malware attacks or other unauthorized attempts to access data on the system 100.

In some examples, the intrusion detection component 110 runs on the hypervisor 112 as shown in FIG. 1. The association of malware detection and intrusion detection can be done on the kernel-based virtual machine (KVM) side. However, the examples are not limited to running on a hypervisor or virtualized environment. The agent specific to programming the events can be portable to a standalone, non-VM host as well.

The file events 114 include one or more file events. A file event is an action or occurrence associated with one or more files which is recognized by software. A file event includes for example, but without limitation, opening a file, closing a file, copying a file, deleting a file, editing a file, a file read, a file write, etc.

The file events 114 include a plurality of file events 114 detected in response to the alert 108. In some examples, monitoring the file events 114 begins when the alert 108 is detected/received. In other examples, file events are constantly monitored and cached for retrieval when an alert 108 is generated/detected or otherwise received from the intrusion detection component 110.

The context multiplex (MUX) 116 in this non-limiting example is a hypervisor user world component, such as a UNIX process. In some examples, a context library such as an endpoint security (EPSec) library is a shared library used to interact with the thin agent of the VM tools 104 via the MUX 116. The event processing component 106 makes use of the EPSec library to receive file events.

In some examples, the event processing component 106 is a component responsible for receiving and processing IDS alerts and events, such as, but not limited to, a hypervisor user world component. It also registers with the EPSec library to receive the file events. The VM tools 104 driver sends all the file events initiated in the guest VM. The event processing component 106 has the ability to send a deny 118 back to the VM tools 104 driver if the file event is suspicious.

When the event processing component 106 receives one or more malware alerts from the intrusion detection component 110, the event processing component 106 starts inspecting file events from the guest VM which correspond to one or more file names provided in the alert(s). The event processing component 106 correlates the events with the alert. Based on the alert severity, the event processing component 106 has the option to deny 118 the file activity.

Correlating the file events 114 with the alert 108 enables the event processing component 106 to generate a set of options for use to remediate the issue associated with the attack or other intrusion associated with the alert 108. The event processing component 106 in some examples sends a corrective action alert 120 to a management plane 124 for viewing by a user. The corrective action alert 120 include the original alert 108 data, as well as a set of options. The set of options include suitable actions for remediating the issue associated with the alert 108. The user views the corrective action alert 120 via a user interface device 126.

The user interface device 126 includes a graphics card or other processor capable of rendering or otherwise processing graphical information for displaying data to the user and receiving data from the user. The user interface device 126 also includes computer-executable instructions (e.g., a driver) for operating the graphics card or other processor. Further, the user interface device 126 may include a display (e.g., a touch screen display or natural user interface) and/or computer-executable instructions (e.g., a driver) for operating the display. The user interface device 126 may also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 126 in one or more ways.

If a user chooses an option from the output set of options, the selected option is sent back to the event processing component 106 in other non-limiting examples. The event processing component initiates or performs the action associated with the selected option 122. For example, but without limitation, if the selection option is to temporarily restrict access to a selected file, the event processing component 106 sends the appropriate instructions to initiate blocking of user access to the file for the selected time-period.

Figure 2:
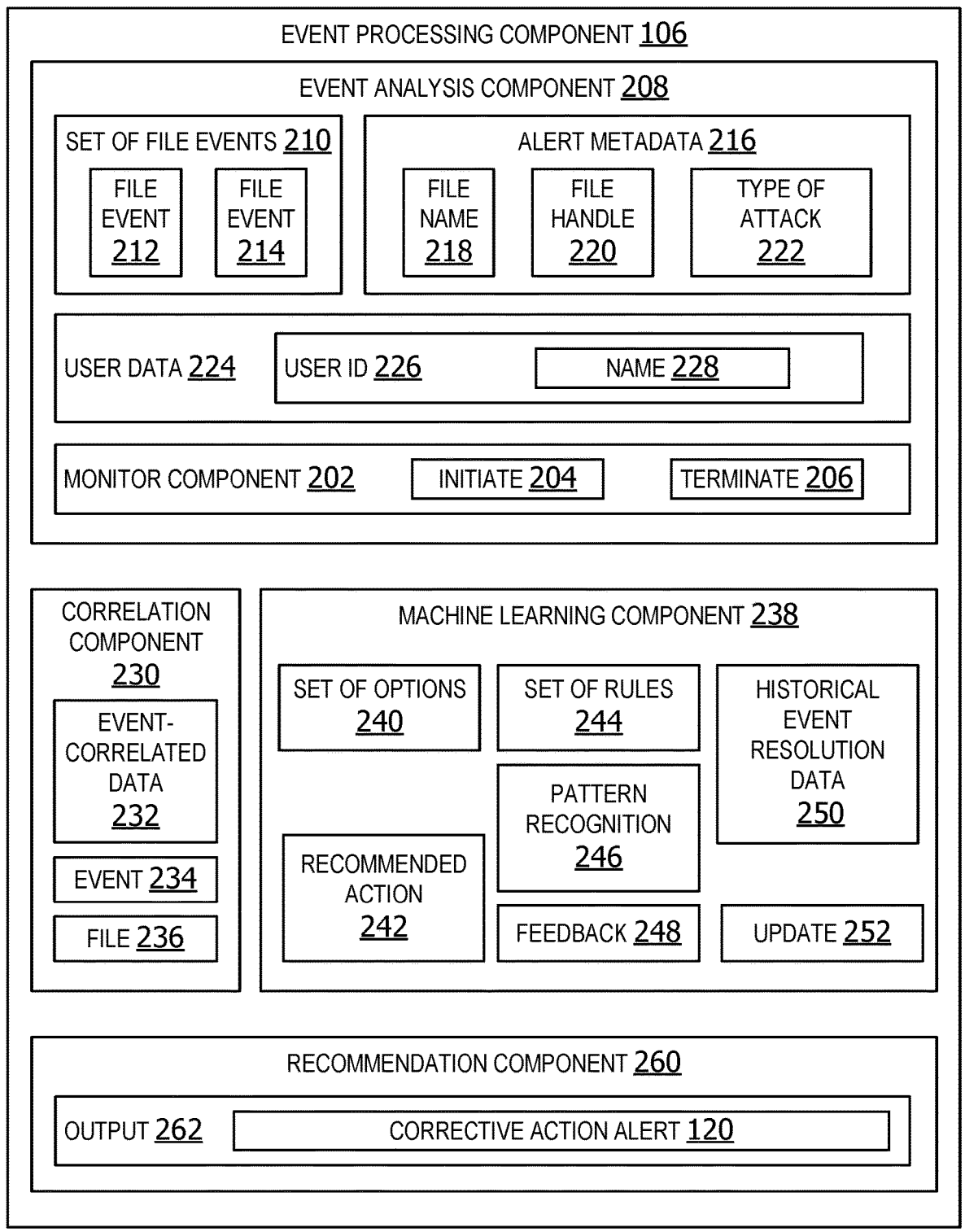
FIG. 2 is an exemplary block diagram illustrating an event processing component according to an embodiment.

FIG. 2 is an exemplary block diagram illustrating an event processing component 106 according to an embodiment. The event processing component 106 in some examples includes a monitor component 202 which initiates 204 monitoring the system for a plurality of file events associated with a received intrusion detection alert, such as, but not limited to, the alert 108 in FIG. 1. In some examples, the monitor component 202 initiates monitoring file events when the alert is generated or detected. The monitor component terminates 206 the monitoring when the alert is remediated, the corrective action alert is generated and/or when the monitoring is otherwise no longer necessary.

The monitor component 202 in other examples receives or monitors file events continually. When an alert is generated by the IDS or detected by the event processing component 106, file events associated with the received malware alert are retrieved from stored or cached file events, and new file events from the thin agent continue to be received/obtained in real time. In other words, the file events are monitored prior to occurrence of an alert and retrieved when needed. The monitored file events are cached for retrieval in response to receiving an alert.

An analysis component 208 analyzes a set of one or more file events 210 with alert metadata 216 obtained from the alert to correlate one or more file events with the alert. The set of file events 210 includes one or more file events, such as, but not limited to, file event 212 and/or file event 214. In this example, the set of file events 210 includes two file events. In other examples, the set of file events 210 includes a single file event, as well as three or more file events. The set of file events 210 includes a file event, such as, but not limited to, the file events 114 in FIG. 1.

Alert metadata 216 is data obtained from the intrusion detection alert. The alert metadata 216 includes data associated with a detected action, such as, but not limited to, a file name 218, a file handle 220 and/or a type of attack 222. The file name 218 is the name or identifier of one or more files. The file handle 220 is a file name or identifier assigned to a temporary file. The file handle may be assigned to an open file which is temporarily being used as a backup for a file being modified. A type of attack 222 is the type of attack associated with the alert. The type of attack includes, but is not limited to, a malware attack, a shellcode attack, or any other type of attack.

The event analysis component 208 also analyzes user data 224 obtained from the thin agent. The user data 224 may include a user identifier (ID) 226, such as, but not limited to, the user's name 228 or username (e.g., login information).

A correlation component 230 correlates the set of file events 210 associated with a file 236 with the alert metadata 216 associated with an intrusion event to obtain and/or identify event-correlated data 232. The event-correlated data 232 is used to identify a set of options 240 which may be implemented to remediate or otherwise correct the intrusion event 234.

The set of options 240 includes one or more options associated with one or more corrective actions which may be taken or performed in response to the alert. The set of options 240 are selected by a machine learning component in response to the type of attack, the type of file, file name, user ID, and/or other data obtained from the correlated-event data. An option in the set of options is a solution or action which is appropriate, available or otherwise applicable to solve or remediate the intrusion associated with the alert.

In some examples, the set of options 240 includes a recommended action 242. The recommended action 242 is an option or action from the set of options which is identified as a best option or option which is most likely to be successful or desirable based on the type of attack, type of file, type of user, etc. In some examples, the recommended action 242 is a pre-generated recommendation based on the identified type of intrusion, file and/or user. In other examples, the recommended action is generated dynamically in real-time by a machine learning component based on the event-correlation data 232.

The machine learning component 238 is an artificial intelligence component for generating the set of options 240 and/or the recommended action 242 from the set of options. The machine learning component 238 includes pattern recognition 246, modeling, or other machine learning algorithms to analyze event-correlated data, alert metadata 216, file event data and/or user data 224.

The machine learning component 238 in some examples generates a set of one or more rules 244 for generating the set of options for each alert. The set of rules 244 includes rules, criteria and/or threshold(s) for determining which options in a plurality of options are applicable to a given alert situation. In some examples, the set of rules 244 is applied to the event-correlation data to map one or more options for resolving the issue(s) associated with the alert to a recommendation or other alert-related output.

The set of rules 244 in some examples includes user-generated rules. In other examples, the set of rules 244 and/or the set of options 140 are user-generated with the machine learning component 238 generating an update 252 to one or more options in the set of options and/or one or more rules in the set of rules based on dynamic events data and/or user-provided feedback 248. In still other examples, the set of rules 244 is autonomously generated dynamically (e.g., in real-time) by the machine learning based on training data, feedback, etc.

Feedback 248 is information provided by one or more users. The feedback 248 includes data indicating accuracy or appropriateness of one or more suggested options and/or the recommended action 242. For example, if a recommended action is not suitable for a particular alert, the feedback 248 includes the information that the recommendation was unsuitable and/or identification of an option or action which is more suitable or appropriate than the recommended action which was output to the user.

The machine learning component 238 in some examples is trained using historical event resolution data 250, manually generated training data and/or feedback 248. The historical event resolution data 250 includes actions previously taken in response to previous intrusion detection alerts. The historical resolution data 250 includes event-correlated data, action applied and/or results (e.g., success indication) of the option or action taken in response to the alert. The machine learning component 238 is able to refine and/or improve the accuracy of the set of options and/or the recommended action(s) output to the user with each malware alert.

In some non-limiting examples, a recommendation component 260 generates an output 262 to the user via a user interface, such as, but not limited to, the user interface device 126 in FIG. 1. The output 262 includes a corrective action alert 120. In some examples, the corrective action alert 120 includes the original alert information (e.g., alert metadata), the event-correlated data 232 identifying the type of attack, file name, user involved, detected action(s) taken, etc. The detected action is an unauthorized, undesirable or other intrusion event associated with an attack or perceived attack on the system or system component, such as a file.

Figure 3:
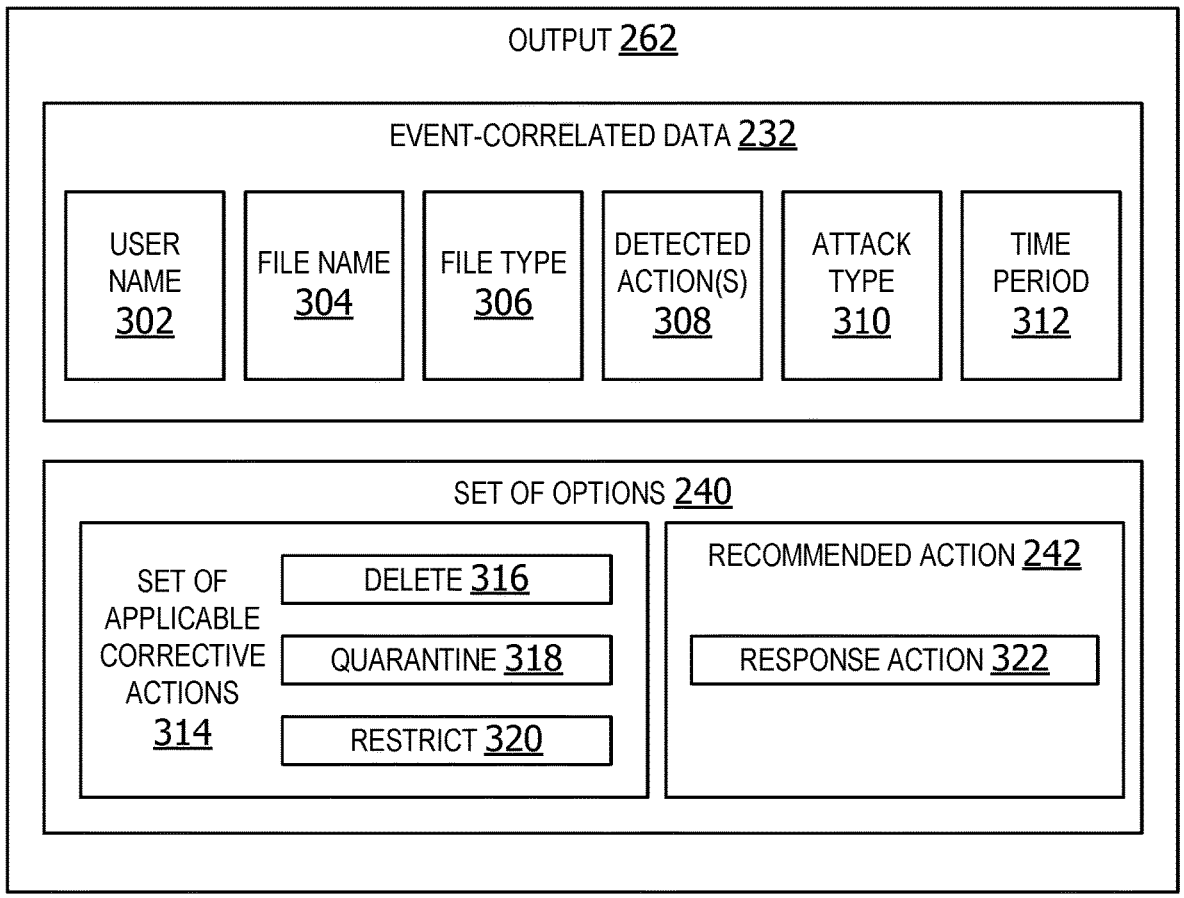
FIG. 3 is an exemplary block diagram illustrating an output generated by the event processing component according to an embodiment.

FIG. 3 is an exemplary block diagram illustrating an output 262 generated by the event processing component according to an embodiment. The output 262 includes event-correlated data 232 and a set of options 240 for remediating the alert. The event-correlated data 232 in some examples includes a user name 302 associated with a user initiating the detected action(s) 308, a file name 304 of the file being impacted by the detected action(s) 308, a file type 306 of the file being impacted by the attack, the detected action(s) 308 which triggered the alert, the attack type 310 and/or the time-period 312 at which the attack or other event occurred.

The attack type 310 indicates whether the attack is a trojan horse, a malware attack, a shellcode attack or any other type of attack or intrusion.

The time-period 312 is the time at which the attack or detected action(s) 308 initiated. The time-period includes a start time, an end time, a time interval, etc.

The set of options 240 includes one or more options which a user could perform or select to address the intrusion or other event associated with the alert. The set of options 240 in some examples includes a set of one or more applicable corrective actions 314. A corrective action in the set of applicable corrective actions includes a delete 316 action to delete a file, a quarantine 318 action to quarantine or isolate the file, a restrict 320 action to block access to the file or any other corrective action with regard to a file subject to a malware attack or other intrusion event.

The set of options 240 optionally includes a recommended action 242. The recommended action 242 is an action which is recommended as a best choice or predicted most effective action from the multiple options available in the set of options 240 output to the user. The recommended action 242 includes a response action 322 recommended to remediate the issue/intrusion associated with the event. The response action may include, without limitation, deleting the file, isolating the file, blocking access to the file, etc.

Figure 4:
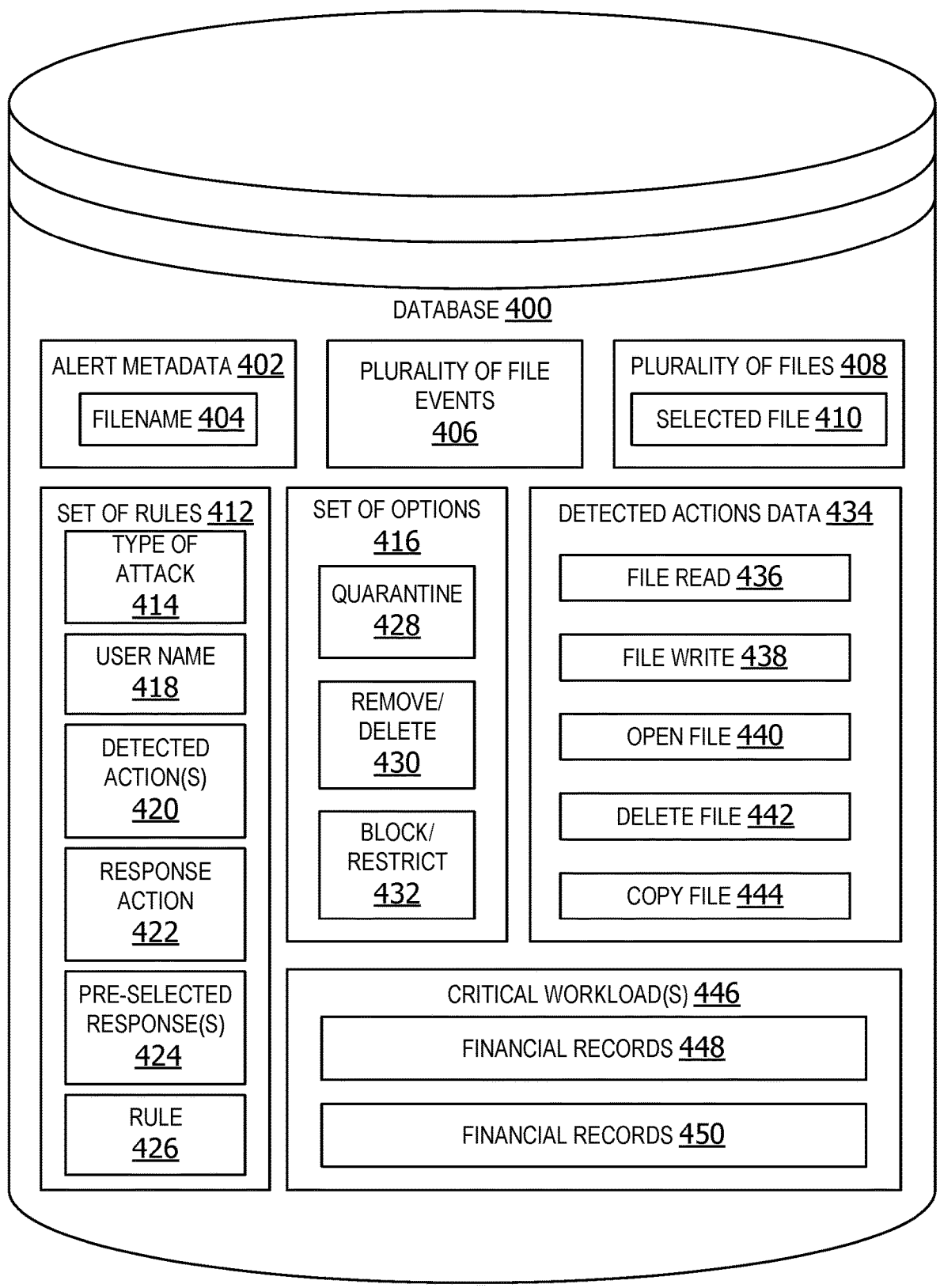
FIG. 4 is an exemplary block diagram illustrating a database storing correlative-event related data according to an embodiment.

FIG. 4 is an exemplary block diagram illustrating a database 400 storing correlative-event related data according to an embodiment. In some examples, the database 400 is a database implemented on a data storage device. The data storage device is a device for storing data, such as, but not limited to alert metadata 402, including a file name 404 and/or file handle identifying a file impacted or otherwise the subject of the detected intrusion action(s).

The plurality of file events 406 includes file events associated with at least one selected file 410 in a plurality of files 408 accessible by the system.

A set of rules 412 for generating the set of options 416 recommended to the user with the alert includes at least one rule 426 for selecting an option/action based on the type of attack 414, username 418, detected action(s) 420, and/or pre-selected response(s) 424. A pre-selected response is a response chosen by a user to be implemented for a given type of attack, detected action, user, and/or file. In other words, the rule 426 specifies that if a malware attack occurs on a financial records file, the system should automatically implement a pre-selected response of blocking all access to the file. In another example, another rule specifies that if a malware attack occurs on another file, options to quarantine or restrict access to the file should be output for user selection or other user decision making.

The set of options 416 in some examples includes actions to quarantine 428 a file, delete or otherwise remove 430 a file, and/or to block or otherwise restrict 432 access to the file. The set of options are not limited to these three options. In other examples, the set of options includes additional actions not shown in FIG. 4. For example, the set of options may include deleting multiple files, replacing the files with a backup copy, etc. Likewise, in other examples, the set of options 416 includes only a single option, as well as two or more options/actions.

Detected action(s) data 434 in other examples, includes data describing/identifying the intrusion-related actions taken or attempted to be performed by the unauthorized or malicious user. The detected action(s) includes a file read 436, a file write 438 event, an open file 440, a delete file 442 action and/or a copy file. However, the possible detected actions triggering an alert are not limited to the actions shown in FIG. 4. In other examples, the detected actions could include moving a file, editing a file, etc.

The database 400 on a data storage device in still other examples may be implemented on a data store, such as, but not limited to, one or more different types of data storage devices, such as, for example, one or more rotating disks drives, one or more solid state drives (SSDs), and/or any other type of data storage device. The data storage device in some non-limiting examples includes a redundant array of independent disks (RAID) array. In other examples, the data storage device includes a database.

The set of rules 412, in other examples, specifies that a pre-selected or automated action be taken in response to an alert associated with critical workload(s) 446. A critical workload is associated with a critical system or sensitive data, such as, but not limited to, one or more financial records 448 and/or user data 450, such as, personal information. Alerts associated with detected action(s) or files associated with critical workloads may trigger the system to automatically initiate corrective actions or other responses without requesting user selection of an option and/or without presenting the set of options to the user.

Figure 5:
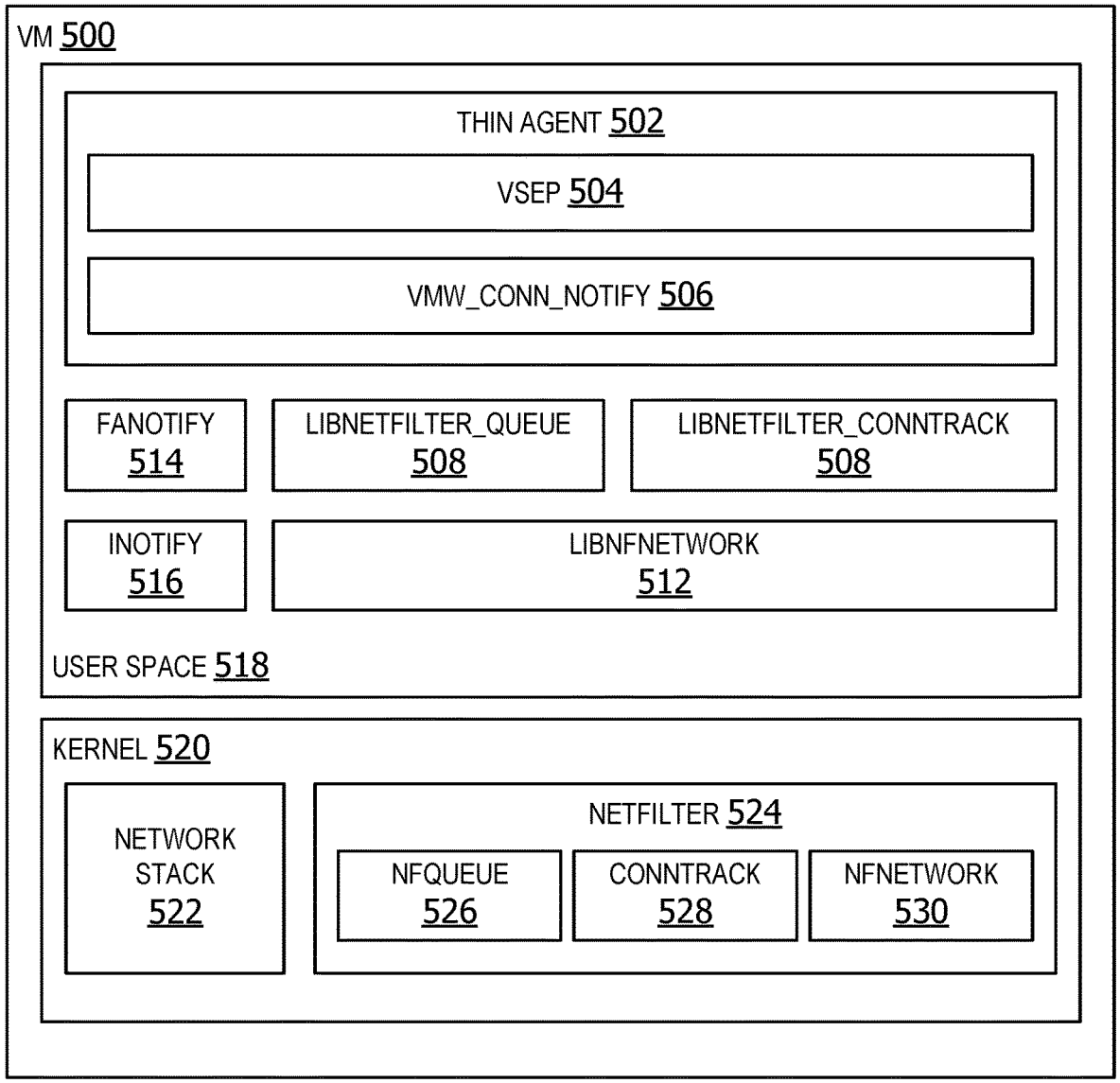
FIG. 5 is an exemplary block diagram illustrating a virtual machine (VM) including a thin agent according to an embodiment.

FIG. 5 is an exemplary block diagram illustrating a VM 500 including a thin agent 502 according to an embodiment. The components shown in FIG. 5 is a non-limiting example of an environment including a thin agent. The thin agent can be implemented for any platform and is not limited to the platform or components shown in FIG. 5.

The thin agent 502 is the guest driver that enables guest introspection of the workload VMs running on a hypervisor to detect malware attacks and obtain alert-related data associated with the user, file, attack, etc. The thin agent may be implemented as a Windows™ or Linux™ driver. The workloads may be, without limitation, Linux™ workload VMs running on an ESX hypervisor.

Introspection refers to monitoring VCIs, such as VMs, and/or runtime state of a system by a hypervisor. This enables offloading of anti-malware agent processing to a dedicated virtual appliance which is secure. In some examples, the introspection includes file, network and system introspection of the workload VM.

File introspection offloads file scanning from the workload VM to a partner security VM (e.g., SVM) running on the same host. The SVM provides the verdict regarding allowing or denying access to the file. Network introspection filters network events and passes them to the SVM. In this example, a vShield EndPoint (VSEP) 504 is a component that enables real-time anti-malware and/or anti-virus scanning or monitoring to be offloaded to a VM for security virtualization. The VSEP 504 enables management of anti-malware policies for virtualized environments using the existing management interfaces for securing the system's physical infrastructure.

In some examples, the thin agent 502 includes a VMW_CONN_NOTIFY 506 component which includes logic that enables the thin agent 502 to interact with one or more netfilter libraries. A netfilter library (LibNet) is a library of functions for filtering event-related data associated with an issue or other event generating an alert. The thin agent 502 in some non-limiting examples, uses components such as, but not limited to, the libnetfilter_queue 508 and/or the libnetfilter_conntrack 510 to receive and/or queue network connection events from the netfilter kernel modules. The network connection events may be captured via a LibNet network, such as, but not limited to, the LibNF network 512.

Fanotify 514 in some examples is a notification and access control system for notifications. The Fanotify 514 includes lists of files, directories, filesystems, and/or mount points associated with events triggering an alert and/or file events being monitored by the system. Inotify 516 in other examples reports changes to filesystems to applications or other components, such as the event processing component.

The thin agent 502 executes in the user space 518. The user space includes code that runs outside the operating system (OS) kernel 520. The user space 518 includes the portion of system memory in which user processes can execute. The thin agent 502 in some examples gathers user-related information associated with an alert or event, such as, but not limited to, the name of the user attempting to perform an action which triggers an alert, identification of user actions, etc.

The thin agent 502 in other examples provides the ability to collect the file information in two cases—on access and on demand. On accessing any file, the agent intercepts the file system call and holds the request until a verdict from SVM is received.

On demand file information collection is an explicit request from the partner security appliance regarding a particular file. The information collected for introspection, i.e. the context is passed to SVM for further processing. Based on the verdict from the SVM, the file access is allowed or denied. In case of file introspection, the thin agent also provides the ability to set exclusion filter rules for the file paths and extensions. The filtering is applicable for on access as well as on demand scans.

The excluded list of files consists of the excluded paths as well as the files with excluded extensions. For the files in the exclusion list, the intercepted file events are not passed to SVM and effectively the scan is bypassed.

The network introspection provides the ability to filter TCP network packets at different stages during the lifetime of the TCP connection at the network stack 522. The network stack 522 includes implementation of the layered set of networking protocols which provide network functions, such as, but not limited to, the TCP/IP network stack within the kernel 520. The pre-connect, post-connect, disconnect and inbound connect are the stages considered for introspection. Pre-connect is just before an outbound connection is attempted. The post-connect refers to the state just after an outbound network connection is established. The disconnect state occurs after the connection is terminated. An inbound connection is established in the inbound connect stage. Listen start refers to when a process starts listening on a port. Listen stop refers to when a process stops listening on a port.

In some examples, the introspection driver supports both internet protocol version 4 (IPv4) and internet protocol version 6 (IPv6) transmission control protocol (TCP) connections. The network introspection driver delivers events in five tuples (Protocol, Source Address, Source Port, Destination Address, Destination Port). The packet is blocked until the information is collected and provided to SVM. Once the information is passed to SVM, packets are allowed to proceed. For filtering network packets on the VM, GI driver communicates with a driver such as vmw-conn-notify 506.

A network driver provides the ability to capture TCP packets on a Linux machine. This driver acts as a server and provides the network packet service to registered clients. This driver uses netfilter 524 libraries and NFQUEUE 526 to capture the packets and communicate the five-tuple information to the clients: (Protocol, Source Address, Source Port, Destination Address, Destination Port). NFQUEUE 526 uses an iptables rule to get only control packets like SYN, FIN, RST. The iptables are used to delegate the decision on packets to a user space 518 component.

The NFnetlink 530 represents a library of functions for netfilter related kernel 520 and user space 518 communications infrastructure. The library includes functions such as, conntrack 528 for tracking and gathering data associated with user actions, logging and/or queueing functions.

Figure 6:
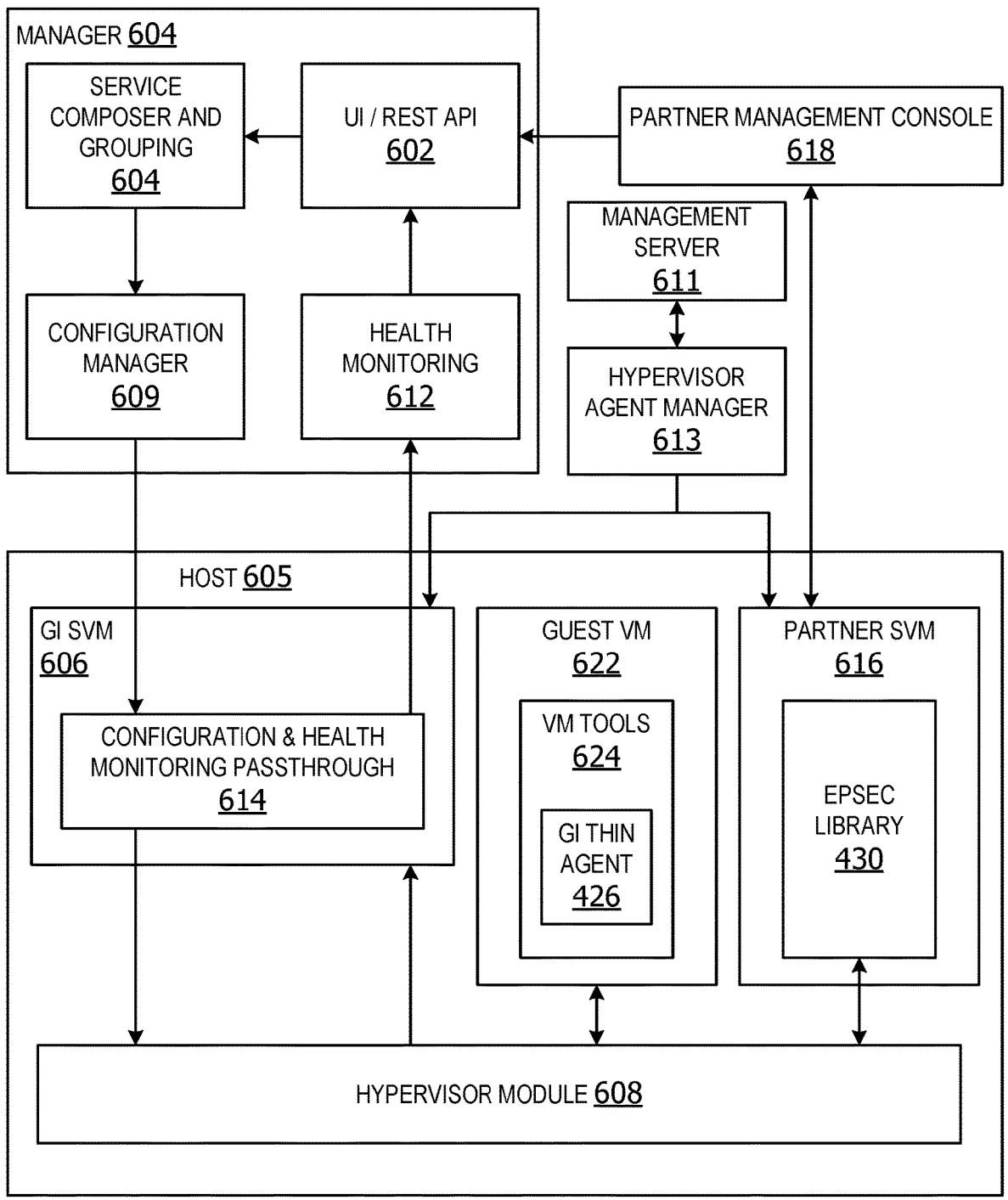
FIG. 6 is an exemplary block diagram illustrating a guest VM according to an embodiment.

FIG. 6 is an exemplary block diagram illustrating a guest introspection architecture for partner integration according to an embodiment. The components shown in FIG. 6 is a non-limiting example of an environment including a thin agent. The thin agent can be implemented for any platform and is not limited to the platform or components shown in FIG. 6.

The guest introspection in some examples is performed in real-time for security virtualization to protect guest VMs from viruses, malware and other malicious unauthorized user actions or other events which trigger an alert.

In this non-limiting example, configuration data flows through a VM, beginning at the user interface (UI) or representational state transfer (REST) application programming interface (API) 602 to the manager 604. The configuration data is utilized by the service composer and grouping 607 and configuration manager 609 component. The configuration data in this example passes from a guest introspection (GI) SVM 606 through a GI hypervisor module 608.

The health monitoring data in this example moves VM health related data from the GI hypervisor module 608 to the GI SVM 606 configuration and health monitoring pass-through 614. The health monitoring data flow continues to the health monitoring 612 component in the manager 604 and the UI/REST API 602.

The partner registration data flows from management server 611 and hypervisor agent manager 613 to the partner SVM 616. The data flow also moves from the partner management console 618 to the UI/REST API 602. A VM-SVM data flow moves data between the GI hypervisor module 608 and the guest VM 622, including the VM tools 624 and the thin agent 626 within the host 605. A communication channel is established between the guest VM and the hypervisor to send information. The thin agent utilizes the communicated information to identify user-related data associated with an event or other alert which is used during correlation of file events with alerts.

In some examples, a partner configuration and/or status is passed from the partner SVM 616 to the partner management console 618. In other examples, the EPSec library assists with moving data within the VM for utilization during event-correlation.

Figure 7:
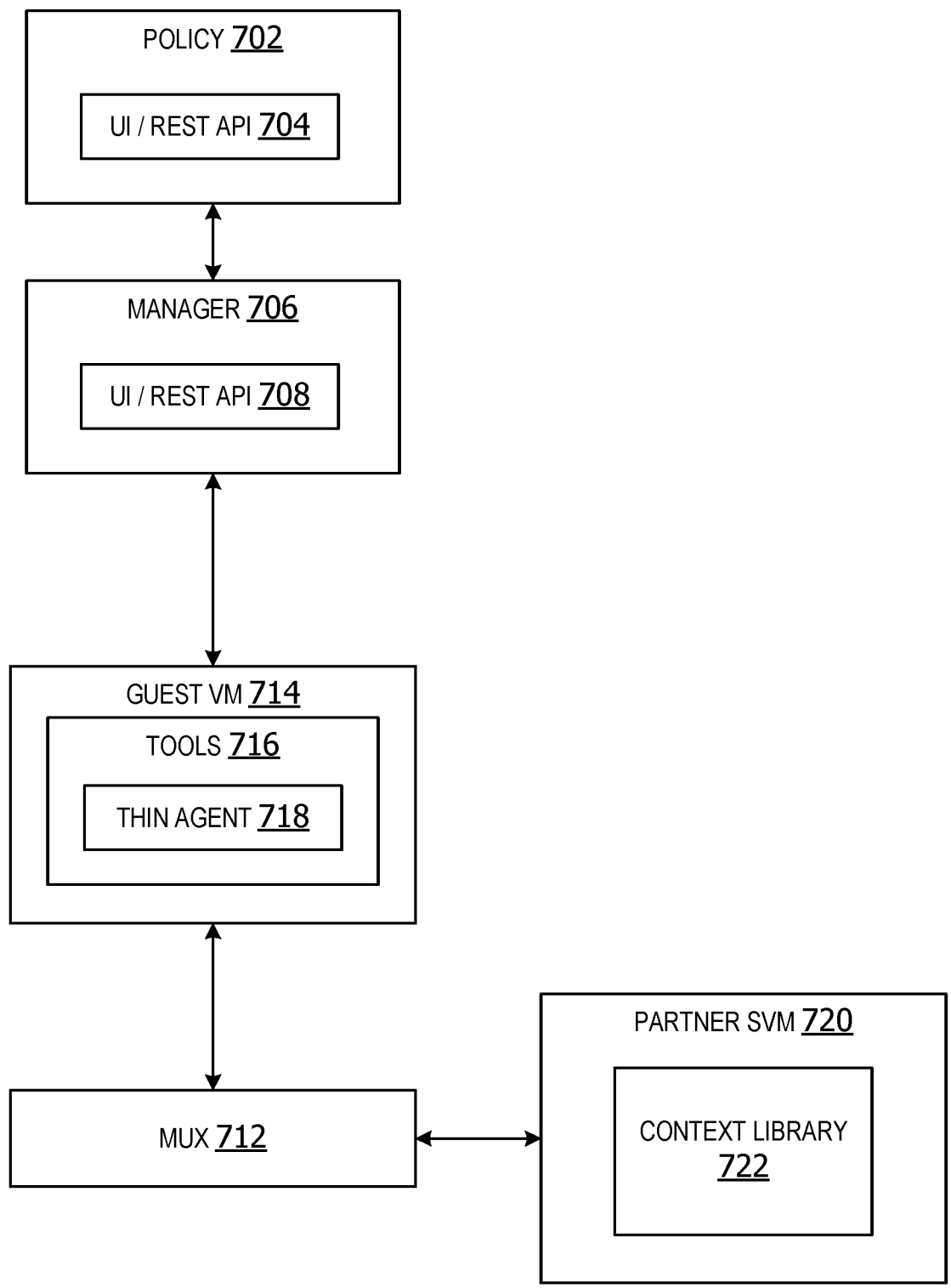
FIG. 7 is an exemplary block diagram illustrating VM tools according to an embodiment.

FIG. 7 is an exemplary block diagram illustrating an architecture for partner integration according to an embodiment. In some examples, configuration data flows from the policy UI/REST API 704 to the policy 702, which includes grouping provider, GI provider and/or service insertion. Health monitoring data flows from the context engine to the manager 706 via the UI/REST API 708. The health monitoring data flow is associated with health status rabbit MX message bus (RMQ).

Monitoring data, such as inventory data, health data, configuration data and/or VM-SVM security monitoring data flows from the MUX 712 to the guest VM 714, including the VM tools 716 and the thin agent 718. The VM-SVM data also flows through the MUX 712 to the partner SVM 720. This flow is associated with the VM communications interface (VMCI). The context library 722 is a library of functions associated with transfer of file events from the thin agent 718 to the event processing component for utilization during correlation of file events to alerts.

Figure 8:
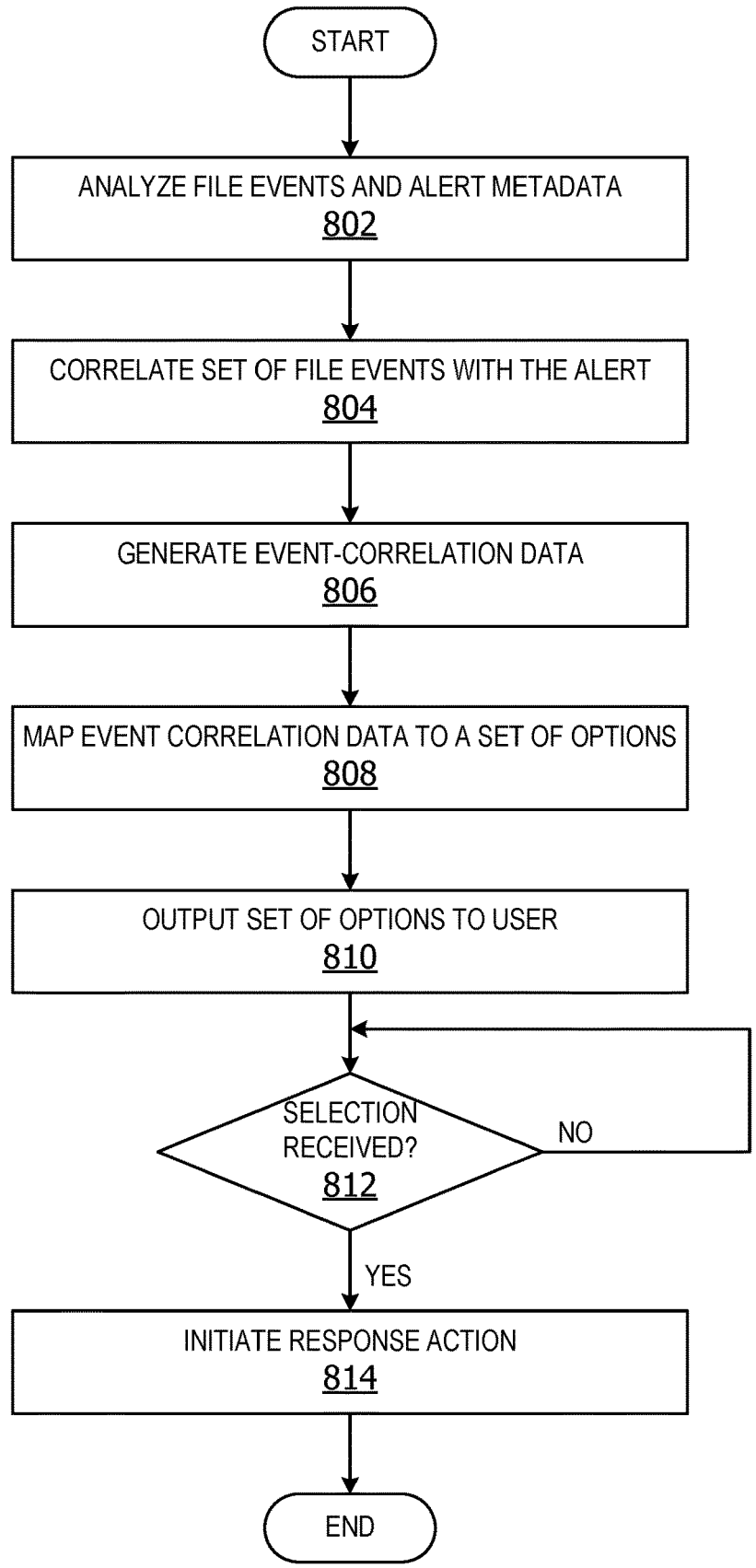
FIG. 8 is an exemplary flow chart illustrating a method of generating corrective action intrusion detection alerts to an embodiment.

FIG. 8 is an exemplary flow chart illustrating a method of generating corrective action intrusion detection alerts to an embodiment. It should be understood that the method 800 as described may be implemented and/or executed by one or more components of a system, such as system 100 and/or the event processing component 106 described above with respect to FIGS. 1 through 7.

The process analyzes file events and alert metadata associated with an alert at 802. In some examples, the alert metadata is metadata obtained from an intrusion detection alert generated by an intrusion detection system, such as, but not limited to, the alert 108 in FIG. 1. The file events include one or more file events, such as, but not limited to, the file events 114 in FIG. 1.

The event processing component correlates the set of file events with the alert at 804. The event processing component generates event-correlation data at 806. The event processing component maps the event-correlation data to a set of options at 808. The mapping is performed in some examples using a set of rules which identify one or more options for resolving one or more issues identified in the event-correlation data.

The event processing component outputs the set of options to a user at 810. The event processing component determines if a user selection of an option from the set of options is received at 812. If yes, the event processing component initiates a response action corresponding to the selection at 814. The response action includes deleting a file, restricting access to a file, quarantine of a file or any other appropriate action to remediate an issue identified in the alert, in some examples. The event processing component determines whether to continue after 814. If yes, the event processing component iteratively executes operations 802 through 814 until a determination is made to no longer continue.

In some examples, the operations illustrated in FIG. 8 are performed by a computing device. However, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

Figure 9:
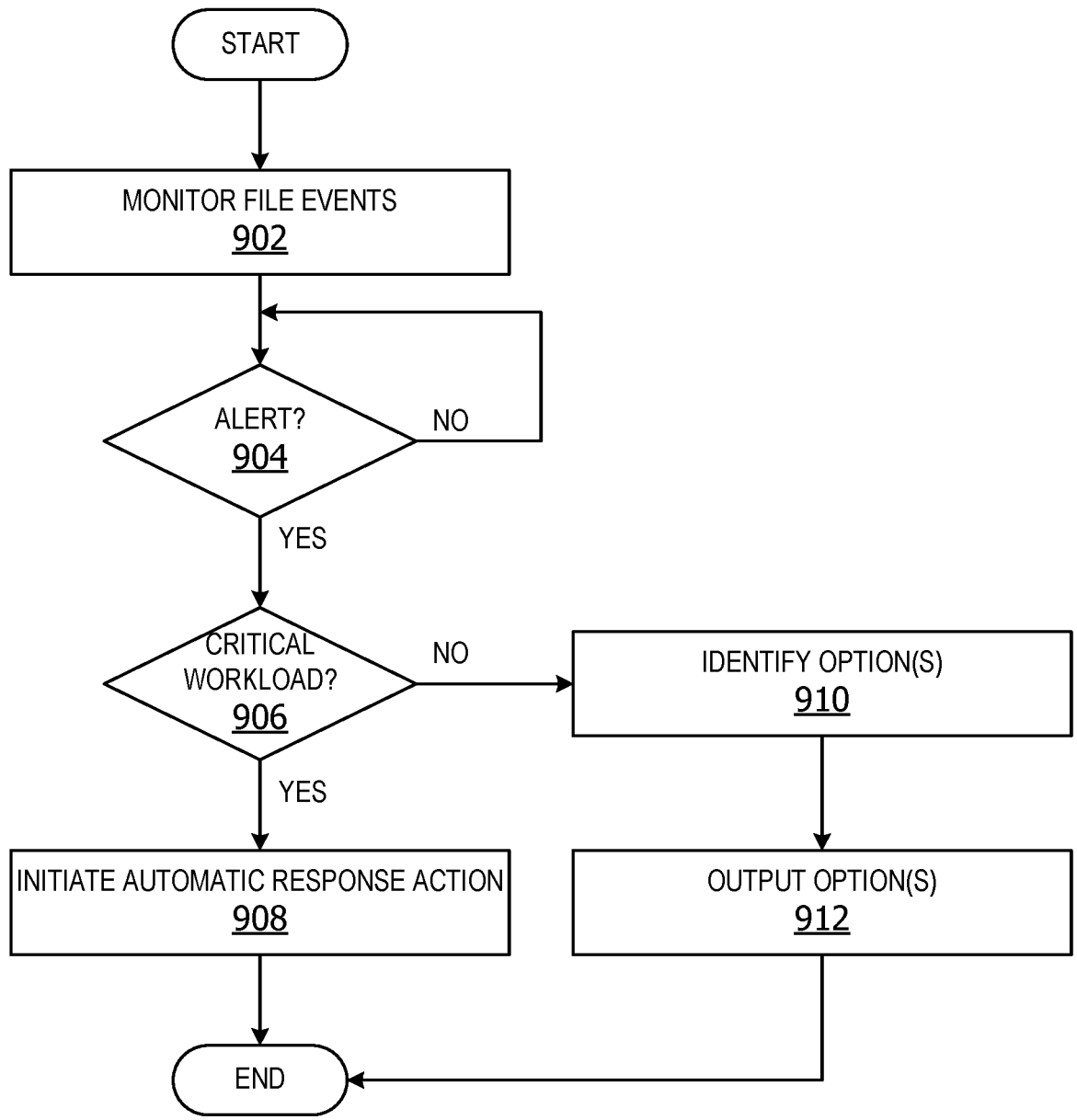
FIG. 9 is an exemplary flow chart illustrating a method of using corrective action intrusion detection for critical workloads according to an embodiment.

FIG. 9 is an exemplary flow chart illustrating a method of using corrective action intrusion detection for critical workloads according to an embodiment. It should be understood that the method 900 as described may be implemented and/or executed by one or more components of a system, such as system 100 and/or the event processing component 106 described above with respect to FIGS. 1 through 7.

The process monitors file events at 902. The event processing component determines if an alert is received or detected at 904. If yes, the event processing component determines if the alert is associated with a critical workload at 906. The critical workload is a high priority file or event. If yes, the event processing component initiates an automatic response action at 908.

If the alert is not associated with a critical workload at 906, the event processing component identifies one or more option(s) at 910. The event processing component outputs the one or more option(s) to a user at 912. The option(s) may be output via a user interface, such as, but not limited to, the user interface device 126 in FIG. 1 or the user interface device 1211 in FIG. 12.

In some examples, the operations illustrated in FIG. 9 are performed by a computing device. However, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 9.

Figure 10:
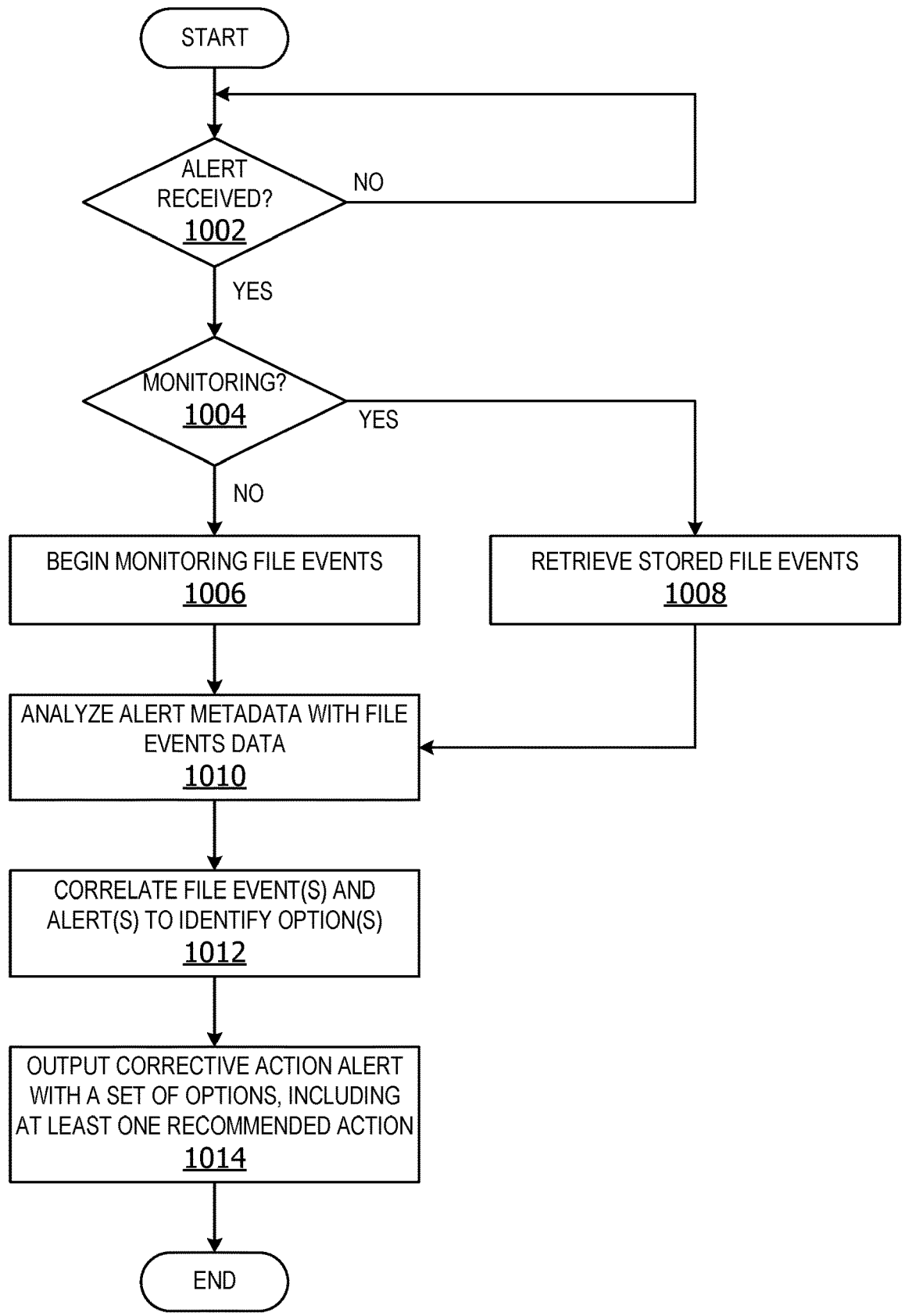
FIG. 10 is an exemplary flow chart illustrating a method of monitoring file events for corrective action intrusion detection according to an embodiment.

FIG. 10 is an exemplary flow chart illustrating a method of monitoring file events for corrective action intrusion detection according to an embodiment. It should be understood that the method 1000 as described may be implemented and/or executed by one or more components of a system, such as system 100 and/or the event processing component 106 described above with respect to FIGS. 1 through 7.

The process determines if an intrusion detection alert is received at 1002. If yes, the event processing component determines if monitoring of file events is already occurring at 1004. If no, the event processing component initiates monitoring of file events from the thin agent at 1006. If file events are already being monitored, the event processing component retrieves the stored file events at 1008. The stored file events may be stored in a cache, a data storage device, a database, a cloud storage, or any other data store.

The event processing component analyzes the alert metadata from the alert with file events data at 1010. The event processing component correlates file event(s) and alert(s) to identify option(s) at 1012. The event processing component outputs a corrective action alert with a set of options including at least one recommended action at 1014.

In some examples, the operations illustrated in FIG. 10 are performed by a computing device. However, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 10.

Figure 11:
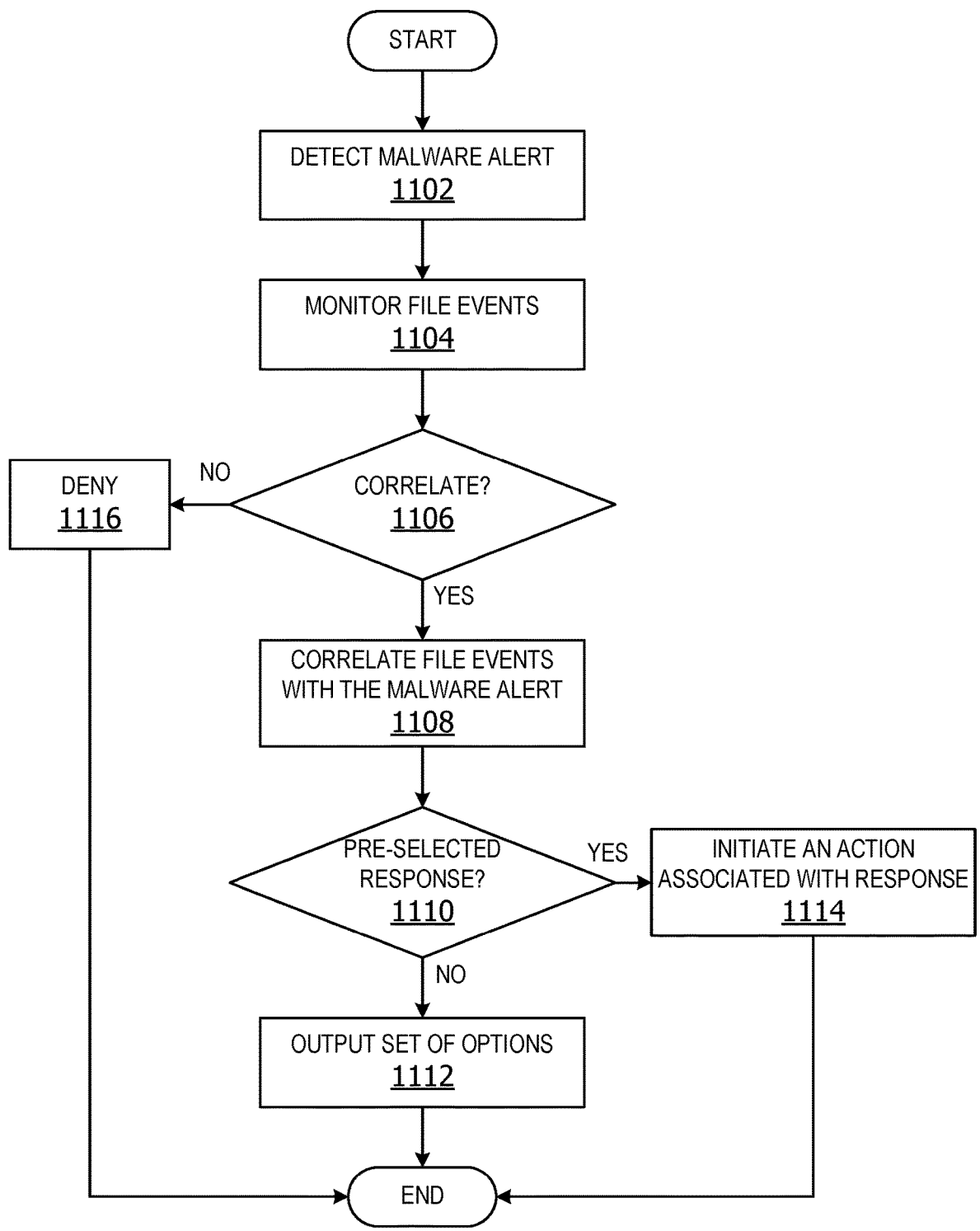
FIG. 11 is an exemplary flow chart illustrating a method of correlating file events to alerts for corrective action intrusion detection alerts according to an embodiment.

FIG. 11 is an exemplary flow chart illustrating a method of correlating file events to alerts for corrective action intrusion detection alerts according to an embodiment. It should be understood that the method 1100 as described may be implemented and/or executed by one or more components of a system, such as system 100 and/or the event processing component 106 described above with respect to FIGS. 1 through 7.

The process detects a malware alert at 1102. The event processing component monitors file events at 1104. The event processing component determines if the file events correlate with the alert at 1106. If yes, the event processing component correlates the file events with the malware alert at 1108. The event processing component determines if there is a pre-selected response at 1110. If no, the event processing component outputs a set of options at 1112 to the user for selection of one or more options by the user to be implemented in response to the alert.

If there is a pre-selected response at 1110, the event processing component initiates an action associated with the pre-selected response at 1114. The pre-selected response is automatically pre-selected based on a set of rules without user input.

If file events do not correlate to the alert at 1106, the event processing component sends a deny back to the thin agent at 1116.

In some examples, the operations illustrated in FIG. 11 are performed by a computing device. However, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 11.

Additional Example Scenarios

Aspects of the disclosure enable various additional scenarios, such as next described. In some examples, the system provides an alternative way to take corrective action on receiving malware alerts from an IDS by making use of file events from guest VMs.

In some examples, an event processing engine in a hypervisor receives alerts from the IDS. The hypervisor may be, without limitation, an ESX hypervisor.

The event processing engine processes the alerts, dedupes them and then sends them to a management plane. The system provides an extension to the event processing engine to make use of data from two entities, the malware alerts from the IDS engine and file events from the VM tools driver (thin agent). The VM tools driver sends all the file events initiated in the guest VM. The event processing engine has a capability to send a "deny" response back to the VM tools driver in case the file event is suspicious.

In other examples, the event processing engine makes use of the EPSec library to receive file events. When it receives malware alerts from the IDS engine, it starts inspecting file events from the guest VM. It correlates the two events. Based on the alert severity, the event processing engine has an option to deny the file activity.

The system in some examples provides extra monitoring or detection on particular files, such as those relating to critical workloads and then takes automatic actions with regard to those files. The correlation component correlates an alert to file events—in the ESX hypervisor 'event processing engine'. The alert metadata includes the name of file and/or type of attack. The system adds additional user-related info such as username (through the thin agent) and then gets events associated with the file name.

The system in other examples outputs a list of file events correlated to the malware alert, such as, but not limited to, username and actions (open file, edit file, delete file, etc.) the user is taking, and then ask security administrator whether they want to allow or restrict access to the file. A distributed firewall rule allows the system to push rules to data plane so all hypervisors apply the rules. Then the hypervisor uses those rules in the future to take automatic action without prompting the user.

Exemplary Operating Environment

Aspects of the disclosure are operable in both virtualized and non-virtualized environments. In virtualized examples that involve a hardware abstraction layer on top of a host computer (e.g., server), the hardware abstraction layer allows multiple containers to share the hardware resource. These containers, isolated from each other, have at least a user application running therein. The hardware abstraction layer thus provides benefits of resource isolation and allocation among the containers. In some examples, virtual machines (VMs) are used alternatively or in addition to the containers, and hypervisors are used for the hardware abstraction layer. In these examples, each VM generally includes a guest operating system in which at least one application runs.

For the container examples, it should be noted that the disclosure applies to any form of container, such as containers not including a guest operating system (OS), referred to herein as "OS-less containers" (see, e.g., www.docker.com). OS-less containers implement operating system-level virtualization, wherein an abstraction layer is provided on top of the kernel of an operating system on a host computer.

The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Figure 12:
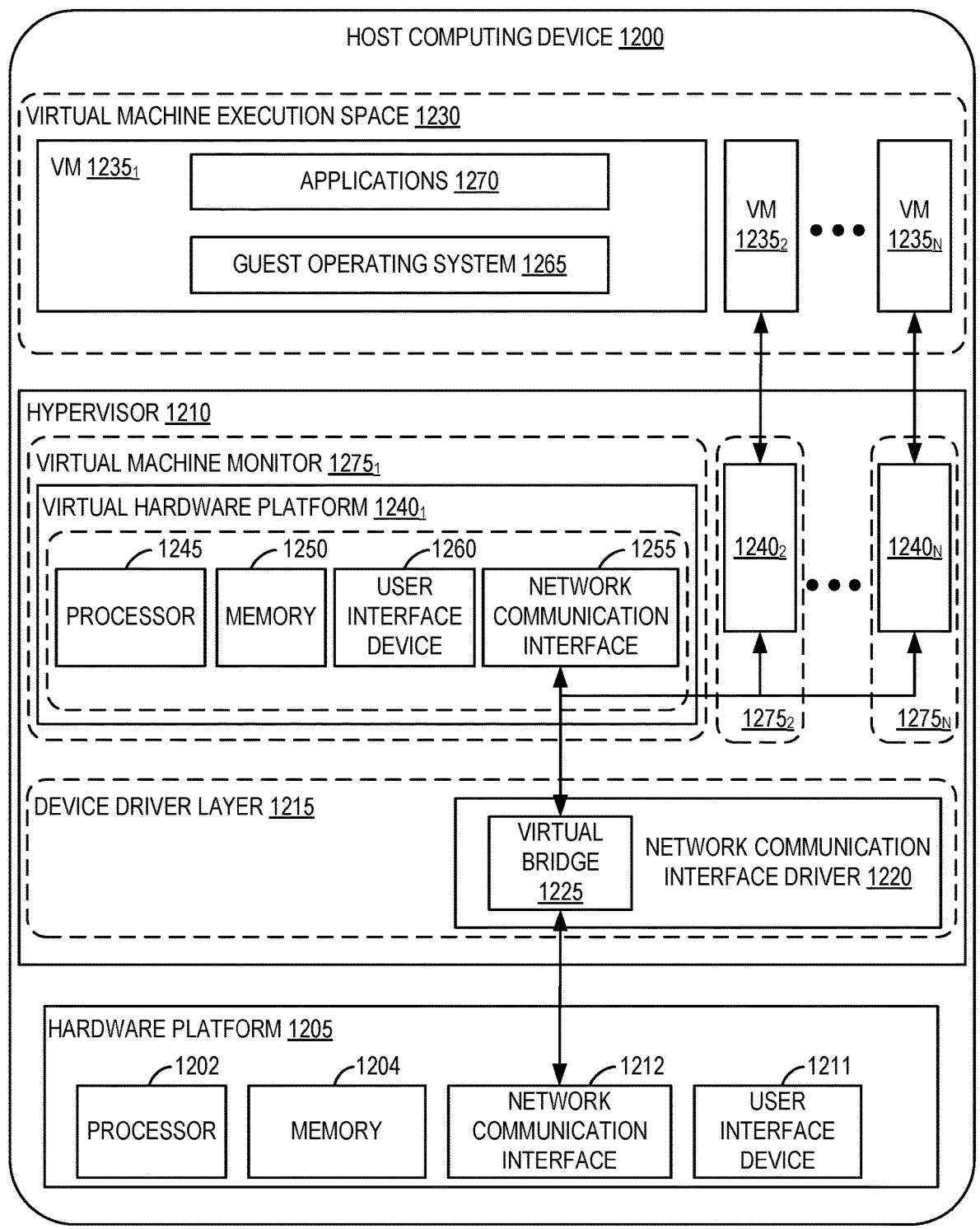
FIG. 12 illustrates a computing apparatus according to an embodiment as a functional block diagram.

In a virtualized example, FIG. 12 depicts a block diagram of VMs $1235_1$, $1235_2$ ... $1235_N$ that are instantiated on host computing device 1200. The host computing device 1200 represents any device executing instructions (e.g., as application(s), operating system, operating system functionality, or both) to implement the operations and functionality associated with the host computing device 1200. The host computing device 1200 may be implemented as a server, a desktop personal computer, kiosks, tabletop devices, industrial control devices, or other host computing device for supporting one or more VCIS, such as, but not limited to, a server in a data center or other physical computing device.

The host computing device 1200 includes a hardware platform 1205, such as an x86 architecture platform. The hardware platform 1205 may include a processor 1202, memory 1204, network communication interface 1212, user interface device 1211, and other input/output (I/O) devices, such as a presentation device 1206. The user interface device 1211 can be implemented as a user interface component, such as, but not limited to, the user interface device 126 in FIG. 1.

The processor 1202 may include one or more processors. A virtualization software layer is installed on top of the hardware platform 1205. The virtualization software layer supports a VM execution space 1230 within which multiple VMs (VMs $1235_1$-$1235_N$) may be concurrently instantiated and executed.

The host computing device 1200 further includes one or more computer executable components. Exemplary components include a hypervisor 1210. The hypervisor 1210 is a VM monitor that creates and/or runs one or more VMs. In one example, the hypervisor 1210 is implemented as a vSphere Hypervisor from VMware, Inc. In other examples, the hypervisor 1210 is a component such as, but not limited to, the hypervisor 112 in FIG. 1.

Hypervisor 1210 in some examples includes a device driver layer 1215, and maps physical resources of the hardware platform 1205 (e.g., processor 1202, memory 1204, network communication interface 1212, and/or user interface device 1260) to "virtual" resources of each of the VMs $1235_1$-$1235_N$ such that each of the VMs $1235_1$-$1235_N$ has its own virtual hardware platform (e.g., a corresponding one of virtual hardware platforms $1240_1$-$1240_N$), each virtual hardware platform having its own emulated hardware (such as a processor 1245, a memory 1250, a network communication interface 1255, a user interface device 1260 and other emulated I/O devices in VM $1235_1$).

Hypervisor 1210 may manage (e.g., monitor, initiate, and/or terminate) execution of VMs $1235_1$-$1235_N$ according to policies associated with hypervisor 1210, such as an open-ended storage policy specifying that VMs $1235_1$-$1235_N$ are to be automatically respawned upon unexpected termination and/or upon initialization of hypervisor 1210. In addition, or alternatively, the hypervisor 1210 may manage execution VMs $1235_1$-$1235_N$ based on requests received from a device other than host computing device 1200. For example, the hypervisor 1210 may receive an execution instruction specifying the initiation of execution of first VM $1235_1$ from a management device via the network communication interface 1212 and execute the execution instruction to initiate execution of first VM $1235_1$.

In some examples, the memory 1250 in the first virtual hardware platform $1240_1$ includes a virtual disk that is associated with or "mapped to" one or more virtual disk images stored on a disk (e.g., a hard disk or solid-state disk) of the host computing device 1200. The virtual disk image represents a file system (e.g., a hierarchy of directories and files) used by the first VM $1235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

The device driver layer 1215 includes, for example, a communication interface driver 1220 that interacts with the network communication interface 1212 to receive and transmit data from, for example, a LAN connected to the host computing device 1200. The communication interface driver 1220 also includes a virtual bridge 1225 that simulates the broadcasting of data packets in a physical network received from one communication interface (e.g., network communication interface 1212) to other communication interfaces (e.g., the virtual communication interfaces of VMs $1235_1$-$1235_N$). Each virtual communication interface for each VM $1235_1$-$1235_N$, such as the network communication interface 1255 for the first VM $1235_1$, may be assigned a unique virtual MAC address that enables virtual bridge 1225 to simulate the forwarding of incoming data packets from the network communication interface 1212. In an example, the network communication interface 1212 is an Ethernet adapter that is configured in "promiscuous mode" such that all Ethernet packets that it receives (rather than just Ethernet packets addressed to its own physical MAC address) are passed to virtual bridge 1225, which, in turn, is able to further forward the Ethernet packets to VMs $1235_1$-$1235_N$. This configuration enables an Ethernet packet that has a virtual MAC address as its destination address to properly reach the VM in the host computing device 1200 with a virtual communication interface that corresponds to such virtual MAC address.

The virtual hardware platform $1240_1$ may function as an equivalent of a standard x86 hardware architecture such that any x86-compatible desktop operating system may be installed as guest operating system (OS) 1265 to execute applications 1270 for an instantiated VM, such as the first VM $1235_1$.

The applications 1270, when executed by the processor, operate to perform functionality on the host computing device 1200. The application(s) may communicate with counterpart applications or services such as web services accessible via a network. For example, the applications may represent downloaded client-side applications that correspond to server-side services executing in a cloud.

The virtual hardware platforms $1240_1$-$1240_N$ may be considered to be part of the VM monitors (VMM) $1275_1$-$1275_N$ that implement virtual system support to coordinate operations between the hypervisor 1210 and corresponding VMs $1235_1$-$1235_N$. Those with ordinary skill in the art will recognize that the various terms, layers, and categorizations used to describe the virtualization components in FIG. 12 may be referred to differently without departing from their functionality or the spirit or scope of the disclosure. For example, the virtual hardware platforms $1240_1$-$1240_N$ may also be considered to be separate from VMs $1275_1$-$1275_N$, and VMs $1275_1$-$1275_N$ may be considered to be separate from hypervisor 1210. One example of the hypervisor 1210 that may be used in an example of the disclosure is included as a component in VMware's ESX brand software, which is commercially available from VMware, Inc.

The functionality described herein can be performed, at least in part, by one or more hardware logic components. According to an embodiment, the computing apparatus 1218 is configured by the program code when executed by the processor 1219 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: analyze, by an analysis component, a plurality of file events and alert metadata obtained from a received malware alert; correlate, by a correlation component, the set of file events identified from the plurality of file events with the malware alert based on the analysis to generate event-correlation data, the event-correlation data comprising a file name associated with the selected file subjected to the detected action, a user identifier associated with a user associated with the detected action, and a type of attack associated with the malware alert; output, by a user interface device, a corrective action alert comprising a set of options for taking corrective action associated with the detected action; and perform, by the event processing component, at least one response action on the selected file corresponding to a user-selected option from the set of options responsive to receiving a selection of an option from the set of options from a user via the user interface device.

One or more exemplary non-transitory computer readable storage media comprises computer-executable instructions for corrective action intrusion detection alerts that, upon execution by a processor, cause the processor to at least: analyze, by an analysis component, a plurality of file events and alert metadata obtained from a received malware alert to correlate a detected action identified in the malware alert with a set of file events associated with a selected file in a plurality of files subjected to the detected action; correlate, by a correlation component, the set of file events identified from the plurality of file events with the malware alert based on the analysis to generate event-correlation data, the event-correlation data comprising a file name associated with the selected file subjected to the detected action, a user identifier associated with a user associated with the detected action, and a type of attack associated with the malware alert; and output, by a user interface device, a corrective action alert comprising a set of options for taking corrective action associated with the detected action.

Alternatively, or in addition to the other examples described herein, examples include any combination of the following:
    initiate, by a monitor component, monitoring for the plurality of file events associated with a received malware alert, wherein monitoring file events begins in response to receiving the malware alert;
    retrieve, from a data storage device, a plurality of file events associated with the received malware alert, wherein file events are monitored prior to occurrence of an alert, and wherein the monitored file events are cached for retrieval in response to receiving an alert;
    perform a response action automatically without user input responsive to a rule in a set of rules specifying a pre-selected response to a type of attack on the selected file identified in the event-correlation data;

initiate an automatic response action without outputting the set of options to the user responsive to determining the malware alert is associated with a critical workload;

generate, by a machine learning component, the set of options based on the event-correlation data, wherein the set of options includes a recommended option for the type of attack identified in the event-correlation data;

update, by a machine learning component, the set of options or a set of rules for identifying the set of options based on feedback received from at least one user.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for monitoring for file events, exemplary means for analyzing file events and alert metadata obtained from a received malware alert to correlate a detected action identified in the malware alert with a set of file events associated with a selected file in a plurality of files subjected to the detected action; exemplary means for correlate, by a correlation component, the set of file events identified from the plurality of file events with the malware alert based on the analysis; exemplary means for generating event-correlation data, the event-correlation data comprising a file name associated with the selected file subjected to the detected action, a user identifier associated with a user associated with the detected action, and a type of attack associated with the malware alert; and exemplary means for outputting a corrective action alert comprising a set of options for taking corrective action associated with the detected action.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for managing corrective action intrusion detection alerts, the method comprising:

correlating, by a correlation component, a set of file events identified from a plurality of file events with a malware alert, the plurality of file events received from a virtual computing instance (VCI);

generating event-correlation data based on the correlated set of file events and metadata from the malware alert, the event-correlation data comprising a file name associated with a file subjected to a detected action associated with the malware alert, a user identifier of a user associated with the detected action, and a type of attack associated with the malware alert;

generating a set of rules to generate a set of options for taking corrective action associated with the detected action;

applying at least one rule of the set of rules to the event-correlation data and generating the set of options for taking the corrective action associated with the detected action;

selecting a response action from the generated set of options; and initiating, by an event processing component, the selected response action on the file responsive to the malware alert.

2. The method of claim 1, wherein the set of rules is generated dynamically based on one or more of training data and user feedback.

3. The method of claim 1, further comprising:

in response to receiving the malware alert, initiating, by a monitor component, monitoring for the plurality of file events associated with the malware alert.

4. The method of claim 1, further comprising:

retrieving, from a data storage device, the plurality of file events associated with the malware alert, wherein file events are monitored prior to receiving the malware alert, and wherein the monitored file events are cached for retrieval in response to receiving the malware alert.

5. The method of claim 1, wherein selecting the response action and initiating the selected response action comprises:

selecting, based on a rule in the set of rules, the response action to the type of attack on the file identified in the event-correlation data; and performing the selected response action automatically without input from the user.

6. The method of claim 1, further comprising:
displaying, by a user interface device, a corrective action alert comprising the set of options for taking the corrective action associated with the detected action; and
receiving a selection of an option from the set of options from the user via the user interface device, wherein selecting the response action comprises selecting a response action based on the received selection of the option from the user.

7. The method of claim 1, further comprising:
generating, by a machine learning component, the set of options based on the event-correlation data, wherein the set of options includes a recommended option for the type of attack identified in the event-correlation data; and
updating, by the machine learning component, the set of options or the set of rules for generating the set of options based on feedback received from at least one user.

8. A computer system for managing corrective action intrusion detection alerts, said computer system comprising:
a processor; and
a non-transitory computer-readable medium having stored thereon program code for transferring data to another computer system, the program code causing the processor to:
correlate a set of file events identified from a plurality of file events with a malware alert, the plurality of file events received from a virtual computing instance (VCI);
generate event-correlation data based on the correlated set of file events and metadata from the malware alert, the event-correlation data comprising a file name associated with a file subjected to a detected action associated with the malware alert, a user identifier of with a user associated with the detected action, and a type of attack associated with the malware alert;
generate a set of rules to generate a set of options for taking corrective action associated with the detected action;
apply at least one rule of the set of rules to the event-correlation data and generate the set of options for taking the corrective action associated with the detected action;
select a response action from the generated set of options; and
initiate the selected response action on the file responsive to the malware alert.

9. The computer system of claim 8, wherein the set of rules is generated dynamically based on one or more of training data and user feedback.

10. The computer system of claim 8, wherein the program code further causes the processor to:
in response to receiving the malware alert, initiate monitoring for the plurality of file events associated with the malware alert.

11. The computer system of claim 8, wherein the program code further causes the processor to:
retrieve, from a data storage device, the plurality of file events associated with the malware alert, wherein file events are monitored prior to receiving the malware alert, and wherein the monitored file events are cached for retrieval in response to receiving the malware alert.

12. The computer system of claim 8, wherein the program code causes the processor to select the response action and initiate the selected response action by:
selecting, based on a rule in the set of rules, the response action to the type of attack on the file identified in the event-correlation data; and
performing the selected response action automatically without input from the user.

13. The computer system of claim 8, wherein the program code further causes the processor to:
display, by a user interface device, a corrective action alert comprising the set of options for taking the corrective action associated with the detected action; and
receive a selection of an option from the set of options from the user via the user interface device, wherein selecting the response action comprises selecting a response action based on the received selection of the option from the user.

14. The computer system of claim 8, wherein the program code further causes the processor to:
generate the set of options based on the event-correlation data, wherein the set of options includes a recommended option for the type of attack identified in the event-correlation data; and
update the set of options or the set of rules for generating the set of options based on feedback received from at least one user.

15. A non-transitory computer readable storage medium having stored thereon program code executable by a first computer system, at a first site, the program code embodying a method comprising:
correlating, by a correlation component, a set of file events identified from a plurality of file events with a malware alert, the plurality of file events received from a virtual computing instance (VCI);
generating event-correlation data based on the correlated set of file events and metadata from the malware alert, the event-correlation data comprising a file name associated with a file subjected to a detected action associated with the malware alert, a user identifier of a user associated with the detected action, and a type of attack associated with the malware alert;
generating a set of rules to generate a set of options for taking corrective action associated with the detected action;
applying at least one rule of the set of rules to the event-correlation data Band generating the set of options for taking the corrective action associated with the detected action;
selecting a response action from the generated set of options; and
initiating, by an event processing component, the selected response action on the file responsive to the malware alert.

16. The non-transitory computer readable storage medium of claim 15, wherein the set of rules is generated dynamically based on one or more of training data and user feedback.

17. The non-transitory computer readable storage medium of claim 15, wherein the program code embodying the method further comprising:
in response to receiving the malware alert, initiating, by a monitor component, monitoring for the plurality of file events associated with the malware alert.

18. The non-transitory computer readable storage medium of claim 15, wherein the program code embodying the method further comprising:

retrieving, from a data storage device, the plurality of file events associated with the malware alert, wherein file events are monitored prior to receiving the malware alert, and wherein the monitored file events are cached for retrieval in response to receiving the malware alert.

19. The non-transitory computer readable storage medium of claim 15, wherein the program code embodying the method for selecting the response action and initiating the selected response action comprises:

selecting, based on a rule in the set of rules, the response action to the type of attack on the file identified in the event-correlation data; and performing the selected response action automatically without input from the user.

20. The non-transitory computer readable storage medium of claim 15, wherein the program code embodying the method further comprising:

displaying, by a user interface device, a corrective action alert comprising the set of options for taking the corrective action associated with the detected action; and receiving a selection of an option from the set of options from the user via the user interface device, wherein selecting the response action comprises selecting a response action based on the received selection of the option from the user.

* * * * *